April 16, 1940.  A. V. POPOFF  2,197,482
HYDRAULIC TRANSMISSION
Filed Aug. 3, 1939   3 Sheets-Sheet 1

ALEXANDER V. POPOFF
INVENTOR.

BY John P. Nironow

ATTORNEY.

April 16, 1940. A. V. POPOFF 2,197,482
HYDRAULIC TRANSMISSION
Filed Aug. 3, 1939 3 Sheets-Sheet 2

ALEXANDER V. POPOFF
INVENTOR.
BY John P. Nixon
ATTORNEY.

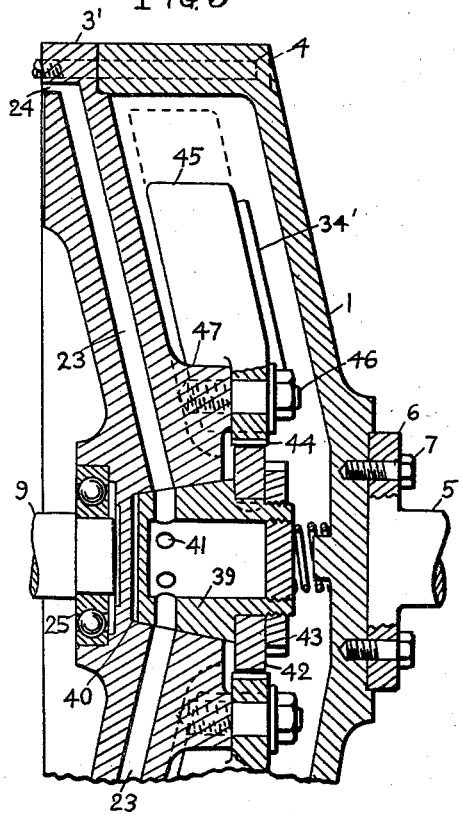
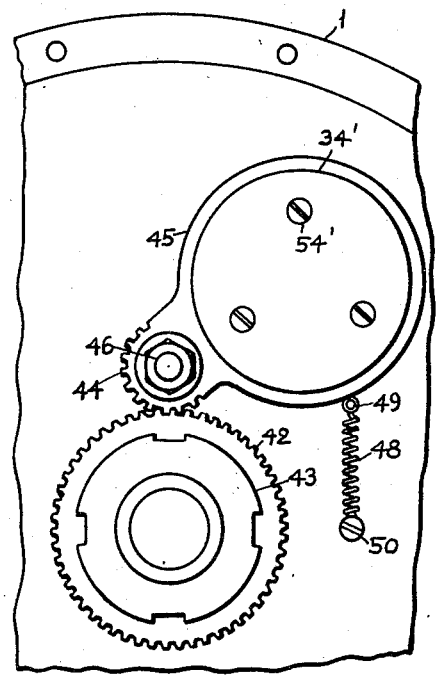
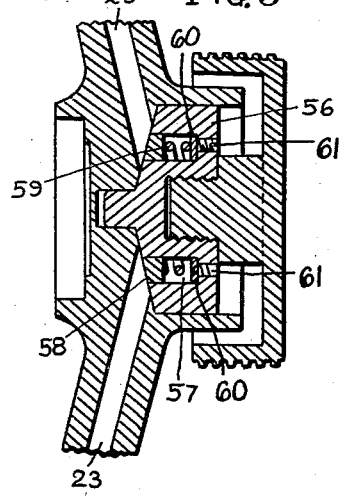

Patented Apr. 16, 1940

2,197,482

UNITED STATES PATENT OFFICE 2,197,482

HYDRAULIC TRANSMISSION

Alexander V. Popoff, New York, N. Y.

Application August 3, 1939, Serial No. 288,161

14 Claims. (Cl. 192—60)

My invention relates to hydraulic transmissions and has particular reference to hydraulic and mechanical transmissions employing reciprocating pumps.

My invention has for its object to provide a transmission between a driving and a driven shaft which will be automatic in its action so as to maintain the driving shaft disconnected from the driven shaft, i. e., free to rotate without rotating the driven shaft, until the rotational speed of the driving shaft reaches a predetermined limit. I accomplish this object by providing a plurality of reciprocating pumps mounted in a casing supported at the end of the driving shaft and operatively connected with the driven shaft, so that the pump will work when there is a relative rotation or slip between the two shafts. The pumps are connected together by ducts into a closed circulation system and a valve is provided for closing the circulation of a liquid through the ducts, the valve being controlled by centrifugal weights so that the system becomes locked at a predetermined speed. The two shafts therefore can rotate independently when the driving shaft rotates very slowly as during the start of the engine, since the liquid can freely circulate through the ducts and the pumps work with very little resistance. As the speed increases, the centrifugal weights gradually close the valve, reducing the passage for the liquid and creating greater resistance, i. e., torque for the driven shaft, which will be gradually accelerated. The acceleration will continue until the driving shaft comes to a normal speed when the weights will fully close the valve, thereby locking together the two shafts for a direct drive. If any considerable resistance is encountered by the driven shaft causing the engine to slow down, then the valve will be more or less opened by the weights, releasing the liquid for circulation and allowing the driving shaft to gain speed, thereby transmitting more power to the driven shaft.

As an additional safety feature, I provide a supplementary valve closing a bypass between the branches of the ducts, a spring closing the valve in such a manner that the valve becomes opened when the pressure of the liquid rises above a predetermined high limit.

My transmission is especially suitable for automobiles and similar automotive vehicles since it automatically disconnects the engine when the torque becomes too great, thereby preventing stalling of the engine, and, at the same time it automatically changes the transmission ratio, increasing it when the resistance becomes too great for a direct drive as, for instance, when climbing hills.

My invention is more fully described in the accompanying specification and drawings in which—

Fig. 3 is a fractional sectional view of a modified device;

Fig. 4 is a fractional end view of the same;

Fig. 5 is a detail view of a relief valve.

Figure 1:
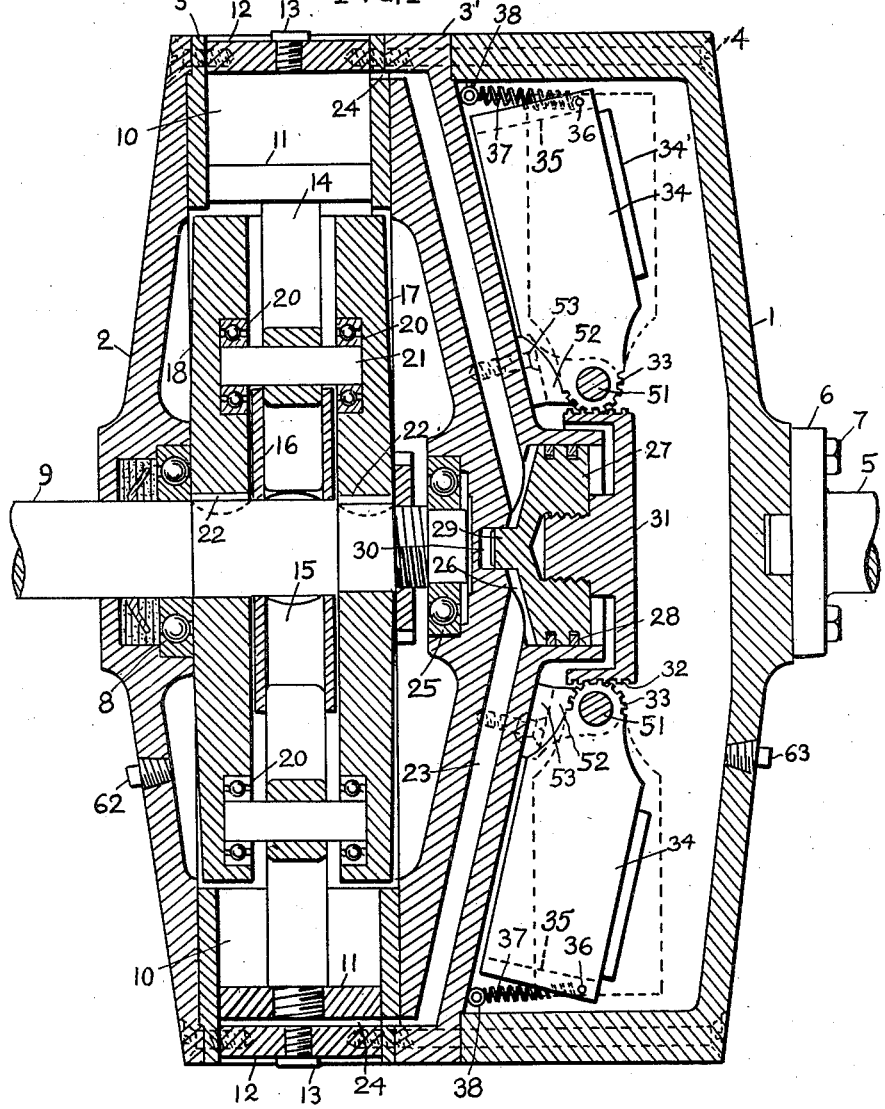
Fig. 1 is a sectional elevational view of my transmission.
Figure 2:
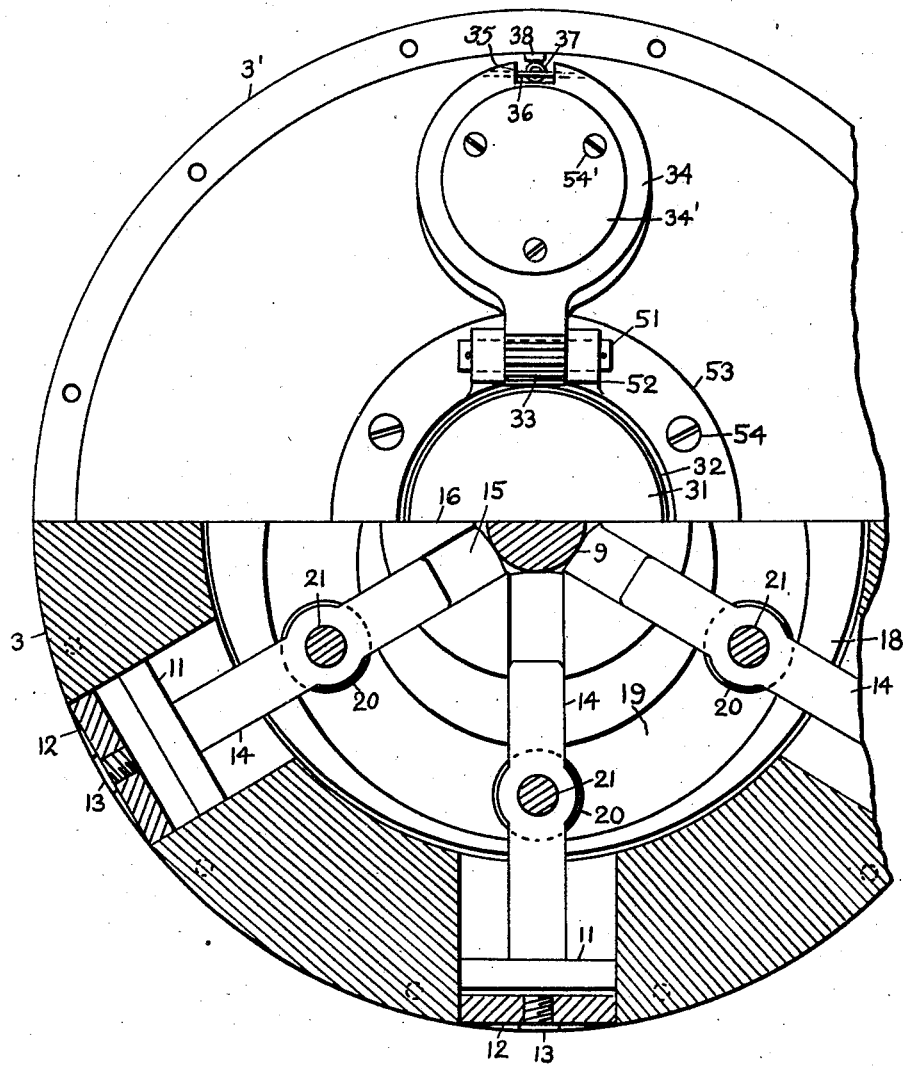
Fig. 2 is an end view of the same partly in section with part of the housing removed.

My transmission consists of a casing formed of front and rear parts 1 and 2 respectively with an intermediate annular member 3 and a disc-shaped member 3', all these parts being joined together as by screws 4. The front part 1 is connected to a driving shaft 5 of an engine (not shown) or other source of power, as by a flange 6 and bolt 7. The rear part 2 has a bearing 8 for a driven shaft 9 extending into the casing and connected outside to a driven mechanism (not shown), as for instance, to the rear axle of an automobile. The annular member 3 has radial bores 10 forming cylinders for plungers or pistons 11 and having outer covers 12 permanently fitted into the bores. Openings are provided in the covers closed with the plugs 13 for filling the cylinders with oil or other suitable liquid, such as a mixture of glycerin and alcohol.

The pistons are rigidly mounted on the ends of rods 14 extending radially to the driven shaft 9. The inner ends of the rods slide in bores 15 in a sleeve 16 rotatively mounted on the inner extension of the shaft 9. The bores are in communication with each other at the shaft, thereby avoiding compression when certain of the rods are moved inward. In order to cause the pistons to reciprocate in the cylinders, eccentric guides are provided in the form of discs 17 and 18 with eccentric grooves 19 for anti-frictional bearings 20 on the ends of cross pins 21 fitting in the middle portions of the rods 14. Discs 17 and 18 are rigidly mounted on the shaft 9 and held by keys 22. The disc part 3' has ducts 23 in communication with channels 24 extending into the bores 10. The part 3' has a bearing 25 at the rear for supporting the inner end of the shaft 9. The ducts extend to a tapering valve seat in a valve chamber 26. Valve 27 is slidably fitted in the chamber 26. A liquid-tight joint is provided by means of sealing rings 28. The end of the valve has an extension 29 sliding in a bore 30 in the part 3'. A cap 31 is connected with the valve 27 and is provided on the outside with annular ribs 32 engaged by gear sectors 33 on centrifugal weights 34. The weights have grooves 35 with pins 36 to which springs 37 are attached, the other ends of the springs being held by eye screws 38 fitted into the part 3'. The weights are rotatively mounted on pins 51 held in brackets 52 extending from a ring 53 fastened to the part 3' by screws 54. Additional plates 34' can be attached to the weights 34 by screws 54' for adjusting the centrifugal action of the weights in order to close the valve 27 at a desired speed of the shaft 5. In the normal position of the weights, the valve 27 is raised from its seat, providing a free passage for the liquid in the cylinders when the latter is circulated through the ducts 23 by the pumping action of the pistons when there is a relative rotation between the shafts 5 and 9. The valve 27 is open, therefore, when the engine is standing still.

The engine, therefore, can be easily started, there being very little resistance encountered for its rotation, since the liquid being pumped by the pistons can freely circulate through the ducts 23. As the speed of the engine increases, the valve is moved inward, restricting the passage for the fluid and transmitting sufficient torque to accelerate the shaft 9. At a certain speed of the driving shaft, the valve will be sufficiently closed when a direct drive will be established between the two shafts, since the pistons will be prevented from moving in the cylinders by the resistance of the liquid. The transmission, therefore, will automatically adjust itself for changing the ratio between the number of turns of the driving and driven shaft in accordance with the resistance encountered by the shaft 9 to its rotation.

A modified valve arrangement is shown in Figures 3 and 4. A tapering plug valve 39 is rotatively fitted in a valve bore 40 and is provided with openings 41 registering with the ducts 23 in the open position of the valve and closing the ducts when the valve is turned into the closed position. For turning the valve it is provided with a gear 42 held by a nut 43 and meshing with the gear sectors 44 on centrifugal weights 45. The weights are pivoted on studs 46 fitted in bosses 47 extending from the part 3'. Springs 48, held at one end to eye screws 49 on the weights and the other end fastened by screws 50 to the part 3', tend to keep the weights inwardly deflected, in which position the valve 39 is fully opened. During rotation of the driving shaft when its speed reaches a predetermined limit, the weights become deflected and they close the ducts 23 by the valve 39.

Another modification is shown in Figure 5 in which a valve 56 similar to the valve 27 is provided with an annular bore 57 for a ring valve 58. The ring valve is tapered on the outside to correspond to the taper of the valve ends pressed against the valve seat by a spring 59.

The pressure of the spring can be regulated by a disc 60 and regulating screws 61. The springs 59 urge the ring outward when the plug valve 56 is moved to the right, thereby keeping the passage partly closed. The spring is so adjusted that when the pressure of the liquid in the cylinders and the ducts reaches a predetermined value, the ring valve 58 is depressed, and a free communication is re-established between the ducts, thereby relieving the pressure. This feature is important in order to render the transmission more flexible under difficult conditions of heavy torque requirements. Holes are provided in the parts 1 and 2, closed by plugs 62 and 63, these holes being used for admitting lubricating oil into the casing. The casing may be completely filled with the oil or may contain only a small amount of the same. This oil is never under any pressure from the pumps, and the danger of its leakage is therefore greatly reduced. The liquid in the cylinders forms a fully closed circulation system, entirely sealed from the rest of the casing.

It is understood that my hydraulic transmission may be further modified without departing from the spirit of the invention, as set forth in the appended claims.

I claim as my invention:

1. A hydraulic transmission comprising a driving shaft, a casing attached to the end of the driving shaft, a plurality of cylinders mounted radially in the peripheral portion of the casing, pistons in the cylinders, a driven shaft, means to rotatively support the end of the driven shaft in the casing, piston rods rigidly connected with the pistons and extending radially toward the axis of the driven shaft, a collar rotatively mounted on the driven shaft and having radial holes slidably supporting the inner ends of the piston rods, an eccentric guide rigidly mounted on the driven shaft inside the casing, transverse extensions on the middle portions of the piston rods slidably engaging the eccentric guide, the pistons being adapted to be successively reciprocated by the eccentric guide when there is a relative rotation between the two shafts, hollow members forming ducts connecting all the cylinders together in a closed circulation system, the cylinder and the ducts being adapted to hold a liquid to be reciprocated by the pistons through the ducts, means to close the ducts thereby preventing circulation of the liquid, and means to control the closing means by the rotational velocity of the driving shaft.

2. A hydraulic transmission comprising a driving shaft, a casing rigidly mounted on the end of the driving shaft, a driven shaft rotatively supported in the casing coaxially with the driving shaft, an eccentric guide supported on the driven shaft in the casing, a plurality of cylinders and pistons slidably fitted in the cylinders and interposed between the casing and the eccentric guide, rods extending from the pistons, means to engage the rods by the guide for reciprocating the rods with the pistons, means to slidably guide the rods in the reciprocating movement, hollow members forming ducts connecting all the cylinders together in a closed circulation system, the cylinders and the hollow members being adapted to hold a liquid to be reciprocated in the cylinders by the relative rotation between the two shafts, means to close the hollow members thereby preventing the liquid from moving through the hollow members and locking the two shafts together, and means to control the closing means by the rotation of the driving shaft.

3. A hydraulic transmission comprising a driving shaft, a casing rigidly mounted on the end of the driving shaft, a driven shaft rotatively supported in the casing coaxially with the driving shaft, an eccentric guide supported on the driven shaft in the casing, a plurality of cylinders and pistons slidably fitted in the cylinders and interposed between the casing and the eccentric guide, rods extending from the pistons, means to engage the rods by the guide for reciprocating the rods with the pistons, means to slidably guide the rods in the reciprocating movement, hollow members forming ducts connecting all the cylinders together in a closed circulation system, the cylinders and the hollow members being adapted to hold a liquid to be reciprocated in the cylinders by the relative rotation between the two shafts, means to close the hollow members thereby preventing the liquid from moving through the hollow members and locking the two shafts together, centrifugal weights rotatively mounted in the casing, and means to operate the closing means by the centrifugal weights for closing the hollow members at a predetermined rotational speed of the driving shaft.

4. A hydraulic transmission comprising a driving shaft, a casing rigidly mounted on the end of the driving shaft, a driven shaft rotatively supported in the casing coaxially with the driving shaft, an eccentric guide supported on the driven shaft in the casing, a plurality of cylinders and pistons slidably fitted in the cylinders and interposed between the casing and the eccentric guide, rods extending from the pistons, means to engage the rods by the guide for reciprocating the rods with the pistons, means to slidably guide the rods in the reciprocating movement, hollow members forming ducts connecting all the cylinders together in a closed circulation system, the cylinders and the hollow members being adapted to hold a liquid to be reciprocated in the cylinders by the relative rotation between the two shafts, weights pivotally mounted in the casing, means to close the hollow members by the weights at a predetermined rotational speed of the driving shaft, and a yieldable means to retrieve the weights.

5. A hydraulic transmission comprising a driving shaft, a casing rigidly mounted on the end of the driving shaft, a driven shaft rotatively supported in the casing coaxially with the driving shaft, an eccentric guide supported on the driven shaft in the casing, a plurality of cylinders and pistons slidably fitted in the cylinders and interposed between the casing and the eccentric guide, rods extending from the pistons, means to engage the rods by the guide for reciprocating the rods with the pistons, means to slidably guide the rods in the reciprocating movement, hollow members forming ducts connecting all the cylinders together in a closed circulation system, the cylinders and the hollow members being adapted to hold a liquid to be reciprocated in the cylinders by the relative rotation between the two shafts, a valve at the point of crossing of the hollow members in the central portion of the casing, a yieldable means to open the valve, and means actuated by the rotational speed of the driving shaft for closing the valve.

6. A hydraulic transmission comprising a driving shaft, a casing rigidly mounted on the end of the driving shaft, a driven shaft rotatively supported in the casing coaxially with the driving shaft, an eccentric guide supported on the driven shaft in the casing, a plurality of cylinders and pistons slidably fitted in the cylinders and interposed between the casing and the eccentric guide, rods extending from the pistons, means to engage the rods by the guide for reciprocating the rods with the pistons, means to slidably guide the rods in the reciprocating movement, hollow members forming ducts connecting all the cylinders together in a closed circulation system, the cylinders and the hollow members being adapted to hold a liquid to be reciprocated in the cylinders by the relative rotation between the two shafts, a valve at the point of crossing of the hollow members in the central portion of the casing, a yieldable means to open the valve, weights pivotally supported on the hollow members, adapted to be turned by the rotational velocity of the driving shaft, and means to close the valve by the weights at a predetermined speed of the driving shaft.

7. A hydraulic transmission comprising a driving shaft, a casing attached to the end of the driving shaft, a plurality of cylinders mounted radially in the peripheral portion of the casing, pistons in the cylinders, a driven shaft, means to rotatively support the end of the driven shaft in the casing, piston rods rigidly connected with the pistons and extending radially toward the axis of the driven shaft, a collar rotatively mounted on the driven shaft and having radial holes slidably supporting the inner ends of the piston rods, an eccentric guide rigidly mounted on the driven shaft inside the casing, transverse extensions on the middle portions of the piston rods slidably engaging the eccentric guide, the pistons being adapted to be successively reciprocated by the eccentric guide when there is a relative rotation between the two shafts, hollow members forming ducts connecting all the cylinders together in a closed circulation system, the cylinder and the ducts being adapted to hold a liquid to be reciproated by the pistons through the ducts, a valve at the central point of intersection of the members with the ducts coaxial with the shafts, a yieldable means to open the valve, and centrifugal weights rotatively supported in the casing adapted to close the valve at a predetermined speed of the driving shaft.

8. A hydraulic transmission comprising a driving shaft, a casing attached to the end of the driving shaft, a plurality of cylinders mounted radially in the peripheral portion of the casing, pistons in the cylinders, a driven shaft, means to rotatively support the end of the driven shaft in the casing, piston rods rigidly connected with the pistons and extending radially toward the axis of the driven shaft, a collar rotatively mounted on the driven shaft and having radial holes slidably supporting the inner ends of the piston rods, an eccentric guide rigidly mounted on the driven shaft inside the casing, transverse extensions on the middle portion of the piston rods slidably engaging the eccentric guide, the pistons being adapted to be successively recipricated by the eccentric guide when there is a relative rotation between the two shafts, hollow members forming ducts connecting all the cylinders together in a closed circulation system, the cylinder and the ducts being adapted to hold a liquid to be reciprocated by the pistons through the ducts, a valve at the central point of intersection of the members with the ducts coaxial with the shafts, a yieldable means to open the valve, centrifugal weights rotatively supported in the casing adapted to close the valve at a predetermined speed of the driving shaft, and means responsive to hydraulic pressure for opening a by-pass between the ducts when the liquid pressure rises to a predetermined limit.

9. A hydraulic transmission comprising a driving shaft, a casing attached to the end of the driving shaft, a plurality of cylinders mounted radially in the peripheral portion of the casing, pistons in the cylinders, a driven shaft, means to rotatively support the end of the driven shaft in the casing, piston rods rigidly connected with the pistons and extending radially toward the axis of the driven shaft, a collar rotatively mounted on the driven shaft and having radial holes slidably supporting the inner ends of the piston rods, an eccentric guide rigidly mounted on the driven shaft inside the casing, transverse extensions on the middle portions of the piston rods slidably engaging the eccentric guide, the pistons being adapted to be successively reciprocated by the eccentric guide when there is a relative rotation between the two shafts, hollow members forming ducts connecting all the cylinders together in a closed circulation system, the cylinder and the ducts being adapted to hold a liquid to be reciprocated by the pistons through the ducts, a valve at the central point of intersection of the members with the ducts coaxial with the shafts, a yieldable means to open the valve, centrifugal weights rotatively supported in the casing adapted to close the valve at a predetermined speed of the driving shaft, a supplementary relief valve for the ducts, and a yieldable means to close the supplementary valve, the supplementary valve being adapted to be opened by the liquid when its pressure rises to a predetermined limit.

10. A hydraulic transmission comprising a driving shaft, a casing attached to the end of the driving shaft, a plurality of cylinders mounted radially in the peripheral portion of the casing, pistons in the cylinders, a driven shaft, means to rotatively support the end of the driven shaft in the casing, piston rods rigidly connected with the pistons and extending radially toward the axis of the driven shaft, a collar rotatively mounted on the driven shaft and having radial holes slidably supporting the inner ends of the piston rods, an eccentric guide rigidly mounted on the driven shaft inside the casing, transverse extensions on the middle portions of the piston rods slidably engaging the eccentric guide, the pistons being adapted to be successively reciprocated by the eccentric guide when there is a relative rotation between the two shafts, hollow members forming ducts connecting all the cylinders together in a closed circulation system, the cylinder and the ducts being adapted to hold a liquid to be reciprocated by the pistons through the ducts, a valve seat formed at the intersection of the ducts in the center of the casing, a poppet valve adapted to engage the seat, a yieldable means to open the valve, centrifugal weights rotatively supported in the housing, and operative connections between the weights and the valve, the weights being adapted to close the valve at a predetermined rotational speed of the driving shaft.

11. A hydraulic transmission comprising a driving shaft, a casing attached to the end of the driving shaft, a plurality of cylinders mounted radially in the peripheral portion of the casing, pistons in the cylinders, a driven shaft, means to rotatively support the end of the driven shaft in the casing, piston rods rigidly connected with the pistons and extending radially toward the axis of the driven shaft, a collar rotatively mounted on the driven shaft and having radial holes slidably supporting the inner ends of the piston rods, an eccentric guide rigidly mounted on the driven shaft inside the casing, transverse extensions on the middle portions of the piston rods slidably engaging the eccentric guide, the pistons being adapted to be successively reciprocated by the eccentric guide when there is a relative rotation between the two shafts, hollow members forming ducts connecting all the cylinders together in a closed circulation system, the cylinder and the ducts being adapted to hold a liquid to be reciprocated by the pistons through the ducts, a valve seat formed at the intersection of the ducts in the center of the casing, a poppet valve adapted to engage the seat, a yieldable means to open the valve, centrifugal weights rotatively supported in the housing, operative connections between the weights and the valve, the weights being adapted to close the valve at a predetermined rotational speed of the driving shaft, a supplementary relief valve movably supported in the first valve, and a yieldable means to close the relief valve, the relief valve being adapted to be opened when the pressure of the liquid reaches a predetermined value.

12. A hydraulic transmission comprising a driving shaft, a casing attached to the end of the driving shaft, a plurality of cylinders mounted radially in the peripheral portion of the casing, pistons in the cylinders, a driven shaft, means to rotatively support the end of the driven shaft in the casing, piston rods rigidly connected with the pistons and extending radially toward the axis of the driven shaft, a collar rotatively mounted on the driven shaft and having radial holes slidably supporting the inner ends of the piston rods, an eccentric guide rigidly mounted on the driven shaft inside the casing, transverse extensions on the middle portions of the piston rods slidably engaging the eccentric guide, the pistons being adapted to be successively reciprocated by the eccentric guide when there is a relative rotation between the two shafts, hollow members forming ducts connecting all the cylinders together in a closed circulation system, the cylinder and the ducts being adapted to hold a liquid to be reciprocated by the pistons through the ducts, a valve seat formed at the intersection of the ducts in the center of the casing, a valve rotatively fitted in the seat coaxially with the shafts, centrifugal weights rotatively supported in the housing, means to rotate the valve by the weights for closing the valve when the rotational speed of the driving shaft reaches a predetermined value, and a yieldable means to open the valve.

13. A hydraulic transmission comprising a driving shaft, a casing attached to the end of the driving shaft, a plurality of cylinders mounted radially in the peripheral portion of the casing, pistons in the cylinders, a driven shaft, means to rotatively support the end of the driven shaft in the casing, piston rods rigidly connected with the pistons and extending radially toward the axis of the driven shaft, a collar rotatively mounted on the driven shaft and having radial holes slidably supporting the inner ends of the piston rods, cross pins fitted in the middle portions of the piston rods in a direction parallel to the shafts, circular eccentric guides mounted on the end of the driven shaft in the casing, rollers on the ends of the cross pins engaging the eccentric guides, the pistons being adapted to be successively reciprocated by the eccentric guides when there is a relative rotation between the two shafts, hollow members forming ducts connecting all the cylinders together in a closed circulation system, the cylinder and the ducts being adapted to hold a liquid to be reciprocated by the pistons through the ducts, means to close the ducts thereby preventing circulation of the liquid, and means to control the closing means by the rotational velocity of the driving shaft.

14. A hydraulic transmission comprising a driving shaft, a casing attached to the end of the driving shaft, a plurality of cylinders mounted radially in the peripheral portion of the casing, pistons in the cylinders, a driven shaft, means to rotatively support the end of the driven shaft in the casing, piston rods rigidly connected with the pistons and extending radially toward the axis of the driven shaft, a collar rotatively mounted on the driven shaft and having radial holes slidably supporting the inner ends of the piston rods, cross pins fitted in the middle portions of the piston rods, plates mounted on the driven shaft at both sides of the piston rods and provided with eccentric grooves for the ends of the pins, bearings on the ends of the pins slidably fitted in the grooves, the pistons being adapted to be reciprocated by the eccentric grooves engaging the pins when there is a relative rotation between the two shafts, hollow members forming ducts connecting all the cylinders together in a closed circulation system, the cylinder and the ducts being adapted to hold a liquid to be reciprocated by the pistons through the ducts, means to close the ducts thereby preventing circulation of the liquid, and means to control the closing means by the rotational velocity of the driving shaft.

ALEXANDER V. POPOFF.